(12) United States Patent
Nagayasu

(10) Patent No.: US 9,511,725 B2
(45) Date of Patent: Dec. 6, 2016

(54) WIRING HARNESS WIRING STRUCTURE

(75) Inventor: Daiki Nagayasu, Yokkaichi (JP)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 410 days.

(21) Appl. No.: 14/354,794

(22) PCT Filed: Feb. 20, 2012

(86) PCT No.: PCT/JP2012/053911
§ 371 (c)(1),
(2), (4) Date: Apr. 28, 2014

(87) PCT Pub. No.: WO2013/061627
PCT Pub. Date: May 2, 2013

(65) Prior Publication Data
US 2014/0306522 A1    Oct. 16, 2014

(30) Foreign Application Priority Data

Oct. 27, 2011    (JP) .................................. 2011-235758

(51) Int. Cl.
*H02G 3/04* (2006.01)
*B60R 16/02* (2006.01)
(Continued)

(52) U.S. Cl.
CPC .............. *B60R 16/0215* (2013.01); *B60L 1/00* (2013.01); *H02G 11/00* (2013.01)

(58) Field of Classification Search
CPC .. B60R 16/0207; B60R 16/0215; B60R 16/00; B60R 16/0239; B60R 16/02; H02G 3/081; H02G 3/088; H02G 11/00; H02G 3/00; H02G 3/04; H05K 5/00; H05K 5/02; H05K 5/0004; H05K 5/0247; H05K 5/0217; B60L 1/00
(Continued)

(56) References Cited

U.S. PATENT DOCUMENTS 6,092,859 A    7/2000 Serizawa et al.
7,042,738 B2 *   5/2006 Tsubaki .............. B60R 16/0215
                                                                174/72 A
(Continued)

FOREIGN PATENT DOCUMENTS

JP    62-018318    1/1987
JP    08-108750    4/1996
(Continued)

OTHER PUBLICATIONS

International Search Report of Apr. 27, 2012.

*Primary Examiner* — Angel R Estrada
(74) *Attorney, Agent, or Firm* — Gerald E. Hespos; Michael J. Porco; Matthew T. Hespos

(57) ABSTRACT

A wiring harness wiring structure is for wiring a wiring harness between a body and a door of a vehicle, and configured to suppress the trapping of water in the door. The wiring harness wiring structure includes a wiring unit partly supported on the body and including the wiring harness, and a protector including an insertion opening into which the wiring unit is to be inserted, an extra length absorbing portion for accommodating the wiring harness while including a margin space, into which the wiring harness is detoured, and a water drainage hole formed in a lower part of the extra length absorbing portion and arranged at a position vertically above and overlapping a through hole formed in a door inner panel and penetrating from a vehicle inner side to a vehicle outer side between a door trim of the door and the door inner panel.

3 Claims, 6 Drawing Sheets

(51) Int. Cl.
*H02G 11/00* (2006.01)
*B60L 1/00* (2006.01)

(58) Field of Classification Search
USPC ............ 174/68.1, 68.3, 72 A, 101, 72 R, 72 C, 174/74 R, 88 R, 70 C, 99 R, 50; 439/76.1, 76.2, 439/949, 207, 212; 385/134, 135; 307/10.1
See application file for complete search history.

(56) References Cited

U.S. PATENT DOCUMENTS

| | | | | |
|---|---|---|---|---|
| 7,053,304 B2* | 5/2006 | Ojima | ............ | B60R 16/0215 174/72 A |
| 7,075,011 B1* | 7/2006 | Kogure | ............ | H02G 11/00 174/72 A |
| 7,202,415 B2* | 4/2007 | Fujita | ............ | B60R 16/0207 174/72 A |
| 7,253,356 B2* | 8/2007 | Kiyota | ............ | H02G 3/081 439/76.2 |
| 7,265,294 B2* | 9/2007 | Tsunoda | ............ | H02G 11/00 174/72 A |
| 7,297,871 B2* | 11/2007 | Watanabe | ............ | H02G 11/00 174/72 A |
| 8,508,068 B2* | 8/2013 | Ushiyama | ............ | B60R 16/0207 307/10.1 |
| 9,029,701 B2* | 5/2015 | Hara | ............ | B60R 16/0215 174/68.1 |
| 9,219,359 B2* | 12/2015 | Sekino | ............ | B60R 16/027 |

FOREIGN PATENT DOCUMENTS

| | | |
|---|---|---|
| JP | 10-181479 | 7/1998 |
| JP | 11-263175 | 9/1999 |
| JP | 2008-195182 | 8/2008 |

* cited by examiner

WIRING HARNESS WIRING STRUCTURE

BACKGROUND

1. Field of the Invention

The present invention relates to a technique for wiring a wiring harness between a vehicle body and a door.

2. Description of the Related Art

Japanese Unexamined Patent Publication No. H11-263175 discloses a wiring structure for vehicle door harness for connecting a body-side harness and a door-side harness by slidably engaging a harness protector, through which the door-side harness is inserted, in a slide guide provided in a vehicle door and fixing the harness protector to a front pillar of a body main body via a protector holder. When the vehicle door is opened and closed, the harness protector slides in the slide guide, following opening and closing movements.

In the wiring structure according to Japanese Unexamined Patent Publication No. H11-263175, water such as rain may fall on the harness protector laid between the vehicle main body and the vehicle door in an opened state of the vehicle door. If the harness protector slides in the slide guide in a state where waterdrops are deposited, water may enter and be trapped in the slide guide.

Accordingly, the present invention aims to suppress the trapping of water in a door.

SUMMARY OF THE INVENTION

A third aspect is directed to a wiring harness wiring structure for wiring a wiring harness between a body and a door of a vehicle, including a wiring unit partly supported on the body and including the wiring harness; and a protector including an insertion opening into which the wiring unit is to be inserted, an extra length absorbing portion for accommodating the wiring harness of the wiring unit while including a margin space, into which the wiring harness of the wiring unit is detoured, a water drainage hole formed in a lower part of the extra length absorbing portion and arranged at a position vertically above and overlapping a through hole formed in a door inner panel and penetrating from a vehicle inner side to a vehicle outer side between a door trim of the door and the door inner panel closer to the vehicle outer side than the door trim, wherein the protector extends downward from the water drainage hole and includes a lead-out portion having a tubular or groove shape and inserted through the through hole of the door inner panel; and the lead-out portion is so shaped that a tip part is at least partly widened radially outward.

A fourth aspect is directed to a wiring harness wiring structure for wiring a wiring harness between a body and a door of a vehicle, including a wiring unit partly supported on the body and including the wiring harness; and a protector including an insertion opening into which the wiring unit is to be inserted, an extra length absorbing portion for accommodating the wiring harness of the wiring unit while including a margin space, into which the wiring harness of the wiring unit is detoured, a water drainage hole formed in a lower part of the extra length absorbing portion and arranged at a position vertically above and overlapping a through hole formed in a door inner panel and penetrating from a vehicle inner side to a vehicle outer side between a door trim of the door and the door inner panel closer to the vehicle outer side than the door trim; wherein the protector extends downward from the water drainage hole and includes a lead-out portion having a tubular or groove shape and inserted through the through hole of the door inner panel; and the lead-out portion is so shaped that a part of a tip part on the vehicle outer side is widened toward the vehicle outer side.

A fifth aspect is directed to a wiring harness wiring structure for wiring a wiring harness between a body and a door of a vehicle, comprising: a wiring unit partly supported on the body and including the wiring harness; and a protector including an insertion opening into which the wiring unit is to be inserted, an extra length absorbing portion for accommodating the wiring harness of the wiring unit while including a margin space, into which the wiring harness of the wiring unit is detoured, a water drainage hole formed in a lower part of the extra length absorbing portion and arranged at a position vertically above and overlapping a through hole formed in a door inner panel and penetrating from a vehicle inner side to a vehicle outer side between a door trim of the door and the door inner panel closer to the vehicle outer side than the door trim; wherein the extra length absorbing portion includes a lower bulging portion bulging further downward than the insertion opening; and the water drainage hole is formed in a lower end part of the lower bulging portion.

According to the wiring harness wiring structure according to the third aspect, the protector includes the water drainage hole formed in the lower part of the extra length absorbing portion, and the water drainage hole is arranged at the position vertically above and overlapping the through hole formed in the door inner panel and penetrating from the vehicle inner side to the vehicle outer side between the door inner panel and the door outer panel. Thus, water having entered into the protector can be drained to the vehicle outer side of the door inner panel through the water drainage hole and the through hole and the trapping of water in the door can be suppressed. Since the protector extends downward from the water drainage hole and includes the lead-out portion having a tubular or groove shape and inserted through the through hole of the door inner panel, the entrance of water being drained from the interior of the protector to the outside through the water drainage hole into the vehicle inner side of the door inner panel can be more reliably suppressed. Since the lead-out portion is so shaped that the tip part is at least partly widened radially outward, it can be prevented that water remains in the lead-out portion.

According to the wiring harness wiring structure according to the fourth aspect, water being drained from the interior of the protector is guided to the vehicle outer side and the entrance of water into the vehicle inner side of the door inner panel can be more reliably suppressed since the lead-out portion is so shaped that the part of the tip part on the vehicle outer side is widened toward the vehicle outer side.

According to the wiring harness wiring structure according to the fifth aspect, water having entered into the protector flows toward the lower bulging portion and is drained from the water drainage hole in the lower end part of the lower bulging portion since the extra length absorbing portion includes the lower bulging portion bulging further downward than the insertion opening and the water drainage hole is formed in the lower end part of the lower bulging portion. Thus, the trapping of water in the door can be more reliably suppressed.

DETAILED DESCRIPTION OF THE PREFERRED EMBODIMENTS

Figure 1:
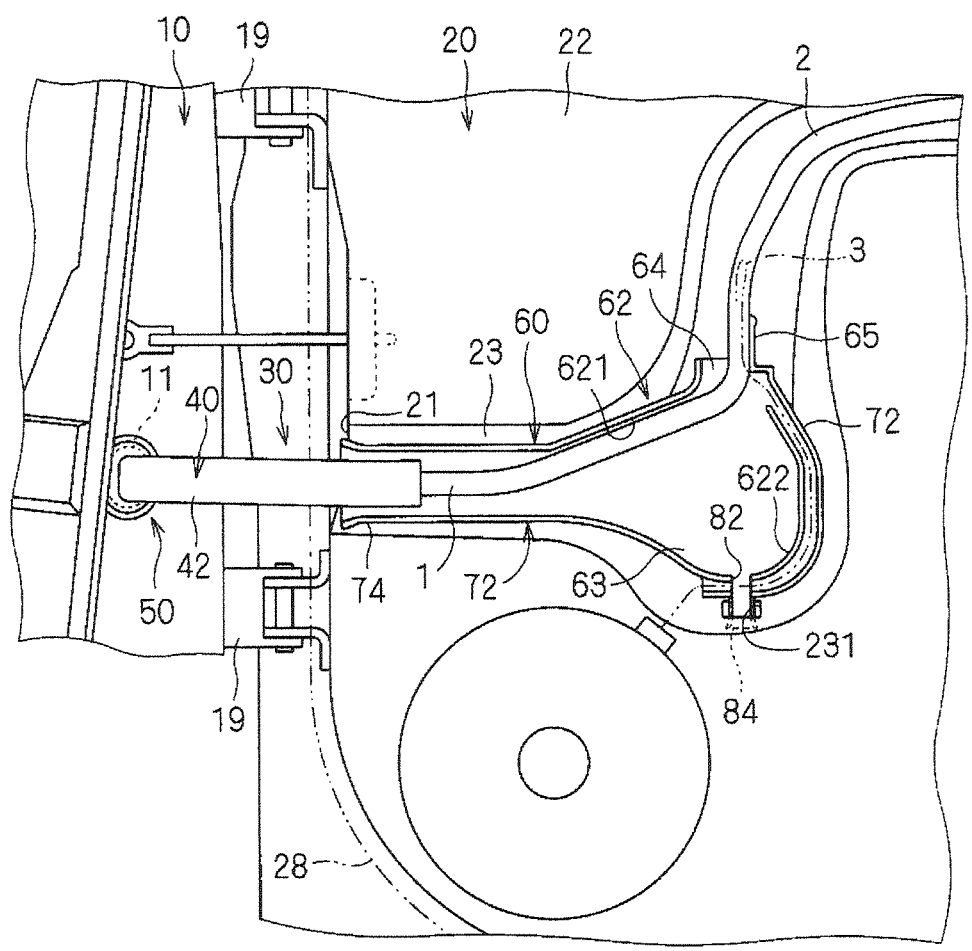
FIG. 1 is a schematic overall view showing a wiring harness wiring structure.

Hereinafter, a wiring harness wiring structure 30 according to an embodiment is described (see FIG. 1). The wiring harness wiring structure 30 is a configuration for wiring a wiring harness 1 between a body 10 and a door 20 of a vehicle.

<Wiring Harness>

A wiring harness 1 as a wiring object is formed in a wired state by bundling a plurality of wires for supplying power or transmitting signals to electrical devices installed in the door 20. Electrical devices installed in the door 20 include a speaker, a side mirror motor, a door lock motor, a power window motor, various switches, etc. Here, a part of the wiring harness 1 laid from the body 10 to the door 20 is formed by bundling a plurality of wires into one. The wiring harness 1 is branched off in the door 20 and connected to various electrical devices.

Further, here is described an example in which a main route wire 2 and a different route wire 3 wired on a route different from that of the main route wire 2 are incorporated into the wiring harness 1. The different route wire 3 is connected to the speaker in a lower part of the interior of the door 20 and the main route wire 2 is connected to other various electrical devices in an upper part of the interior of the door 20 (see FIG. 1).

<Body and Door>

The body 10 is a part formed such as by welding frames and panels formed of a metal material or the like. A doorway for enabling a passenger to get into and get out of the vehicle is formed on a lateral part of the body 10.

The body 20 is coupled to the body 10 such as by hinge portions 19 to be able to open and close the doorway. More specifically, an end part of the door 20 on a vehicle front side in a closed state is coupled to a front pillar (part located on a vehicle front side of an inner peripheral part of the doorway of the body 10), openably and closably about a coupling axis extending along a substantially vertical direction. Further, the door 20 includes a door inner panel 22, a door outer panel 24 and a door trim 26. The door inner panel 22 is a part provided between the door outer panel 24 and the door trim 26. The door outer panel 24 is an exterior member of the door 20 and mounted at a vehicle outer side of the door inner panel 22. The door trim 26 is an interior member of the door 20 and mounted at a vehicle inner side of the door inner panel 22. The door inner panel 22 and the door outer panel 24 are formed such as by punching a metal plate and press-forming the punched pieces. Further, the door trim 26 is formed of a synthetic resin material or the like.

An end part of the door 20 coupled to the body 10 may be referred to as a front side and an opposite side may be referred to as a rear side. Further, for the door 20 and a part of the wiring harness wiring structure 30 wired in the door 20, a surface seen when the door 20 is viewed from front is a front surface and a surface seen when a vehicle outer side is seen from a vehicle inner side of the door is a side surface.

The wiring harness wiring structure 30 is for wiring the wiring harness 1 through the front pillar of the body 10 and between the door inner panel 22 and the door trim 26 of the door 20. Thus, the front pillar of the body 10 is formed with a body wiring hole 11 through which the wiring harness 1 is wired. Further, a front end part of the door 20 is formed with an introducing opening 21 for wiring the wiring harness 1 between the door inner panel 22 and the door trim 26. This introducing opening 21 is formed by combining a front end edge part of an accommodating recess 23, which is formed on the door inner panel 22 and open toward the vehicle inner side, and a front end edge part of the door trim 26. The body wiring hole 11 of the body 10 and the introducing opening 21 of the door 20 are provided in parts facing each other in the closed state of the door 20. Further, the accommodating recess 23 is a part in which a protector 60 to be described later is mainly accommodated in the door 20, and includes an inner space into which the protector 60 can be entirely or partly accommodated.

Further, the door 20 includes a waterproof weather strip 28 along a peripheral edge part. This weather strip 28 is formed of a resilient material such as rubber which can be held in close contact with the inner peripheral part of the doorway of the body 10 and maintain a watertight state inside and outside the vehicle in the closed state of the door 20 (see FIG. 3). This wiring harness wiring structure 30 is so configured that the wiring harness 1 is wired at a vehicle inner side of the weather strip 28.

<Overall Configuration of Wiring Harness Wiring Structure>

The wiring harness wiring structure 30 includes a wiring unit 40 including the wiring harness 1, a body fixing member 50, the protector 60 and a through hole 231 (see FIG. 1).

The wiring unit 40 is wired between the body 10 and the door 20 and includes the wiring harness 1 and an exterior member 42.

The exterior member 42 is provided to cover a part of the wiring harness 1 including the part laid between the body 10 and the door 20. This exterior member 42 is a member for protecting the wiring harness 1 from outside and supporting the wiring harness 1 between the body 10 and the door 20.

The exterior member 42 is formed to be bendable and deformable according to bending movements of the wiring harness 1 inserted at an inner side associated with opening and closing movements of the door 20 and formed to be able to support the wiring harness 1 between the body 10 and the door 20 by suppressing the bending, slackening and hanging of the wiring harness 1. More specifically, a member having higher rigidity than the wiring harness 1 is adopted as the exterior member 42. Here, the exterior member 42 is a corrugated tube manufactured by extrusion-molding synthetic resin (e.g. PP (polypropylene, PA (polyamide)) into a tubular shape and applying blow molding or vacuum molding (see FIG. 4). The corrugated tube is a tubular member in which circumferentially extending convex peak parts and concave valley parts are alternately and successively provided in an extending direction. Further, the exterior member 42 is formed into a flat shape (here, so shaped that a pair of semicircular arcs facing each other are connected by a pair of straight lines in a cross-section perpendicular to the extending direction). Specifically, the exterior member 42 is shaped to be difficult to bend in a longitudinal direction (high rigidity) and easy to bend (high flexibility) in a short side direction in the cross-section perpendicular to the extending direction.

However, the exterior member 42 has only to have higher rigidity than the wiring harness 1 and is not limited to the aforementioned corrugated tube. For example, the exterior member may be formed of relatively hard rubber (EPDM (ethylene propylene diene rubber), elastomer, etc.) into a flat tubular shape. Further, the exterior member 42 may be shaped to have a circular cross-section or the like without being limited to a flat shape.

Figure 2:
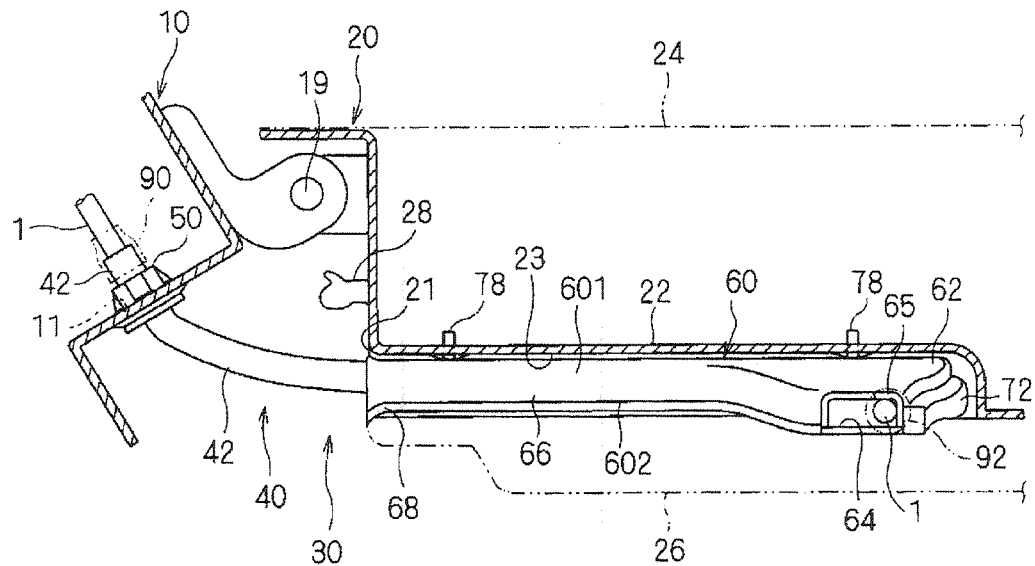
FIG. 2 is a plan view showing the wiring harness wiring structure in an opened state of a door.
Figure 3:
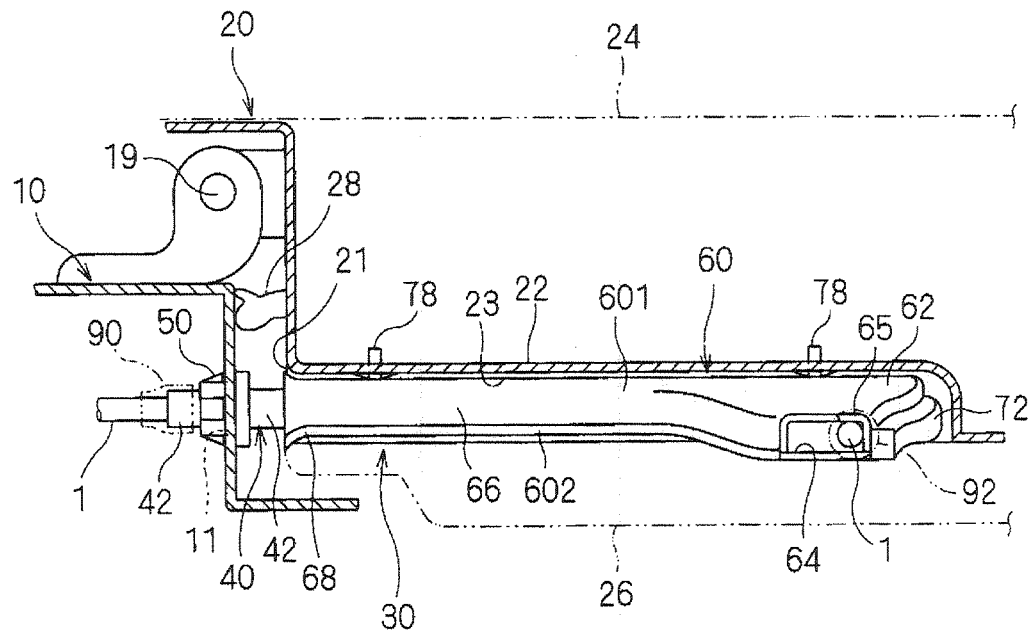
FIG. 3 is a plan view showing the wiring harness wiring structure in a closed state of the door.

An end part of the exterior member 42 on the side of the body 10 is fixed to the wiring harness 1 such as by a tape 90 in the body 10 and a part thereof near the end part on the side of the body 10 is fixed to the body 10 by the body fixing member 50 (see FIGS. 2 and 3). In this way, the wiring unit 40 is partly supported on the body 10. The exterior member 42 is movable back and forth in the door 20 together with the wiring harness 1 as the door 20 is opened and closed.

Figure 4:
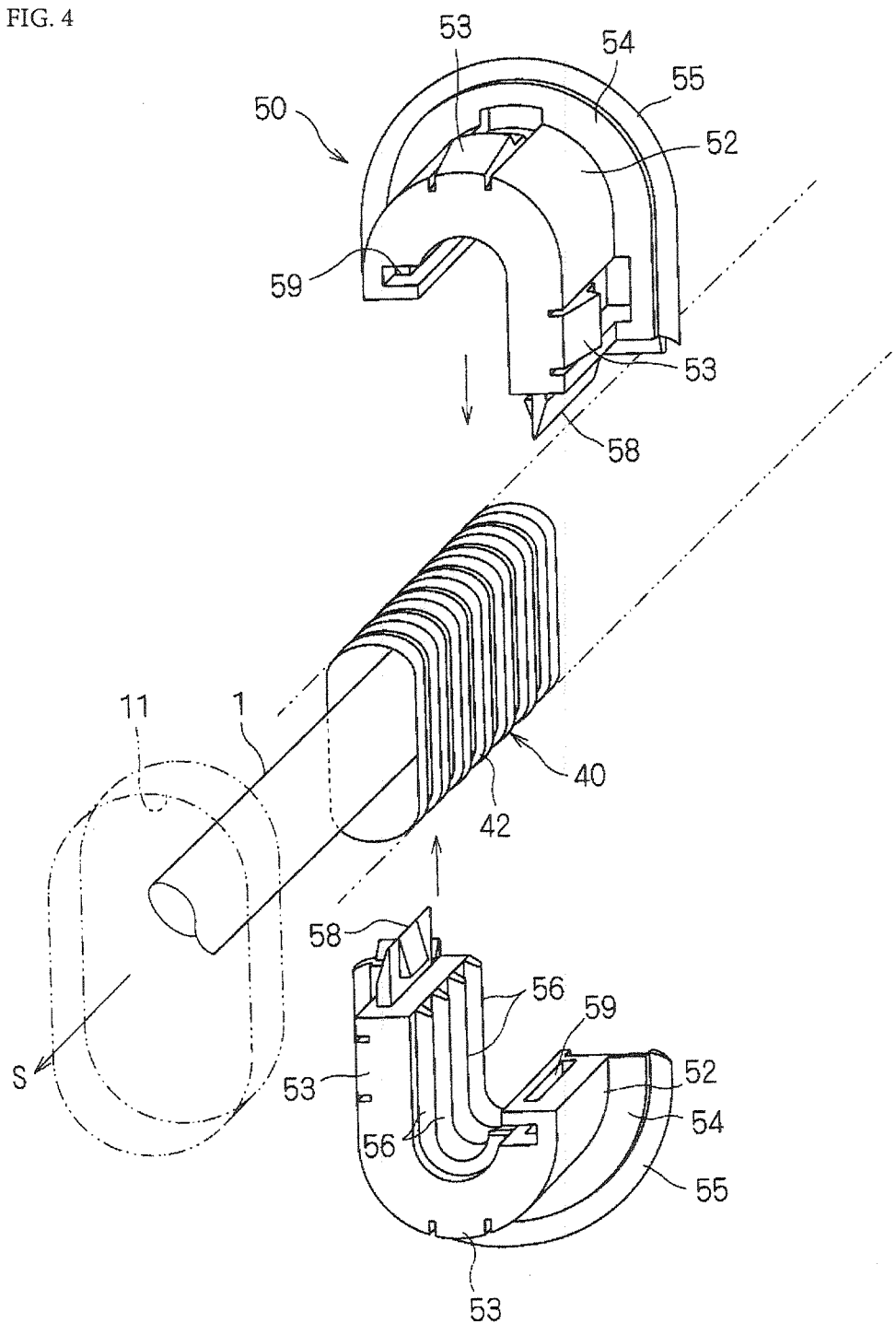
FIG. 4 is an exploded perspective view of a body fixing member.

The body fixing member 50 is a part for supporting the wiring unit 40 on the body 10 (see FIG. 4). This body fixing member 50 is mounted on a part of the exterior member 42 near the end part on the side of the body 10 and fixed to an opening edge part of the body wiring hole 11. Further, the body fixing member 50 is a part for protecting the wiring unit 40 from the opening edge part (edge) of the body wiring hole 11 (also called an edge protector because of this).

This body fixing member 50 includes an inserting portion 52, a plurality of locking portions 53, a jaw portion 54, a biasing portion 55 and positioning ribs 56.

The inserting portion 52 is a part interposed between the body wiring hole 11 and the wiring unit 40 and adapted to protect the wiring unit 40. This inserting portion 52 is formed into a tubular shape which is insertable into the body wiring hole 11 and in which the exterior member 42 can be arranged. The inserting portion 52 is inserted into the body wiring hole 11 while facing a substantially front side of the vehicle. For the convenience of description, S denotes an inserting direction in which the inserting portion 52 is inserted into the body wiring hole 11 and this direction is also used to describe the orientation of the body fixing member 50 itself.

More specifically, an outer peripheral part of the inserting portion 52 is shaped to correspond to the opening edge part of the body wiring hole 11 as a whole and set to have a slightly smaller size than the body wiring hole 11. Further, an inner peripheral part of the inserting portion 52 is shaped to correspond to the outer shape of the peak parts of the corrugated tube as the external member 42 and is set to have a slightly larger size than the outer shape of the peak parts. Here, the corresponding shape is a substantially similar shape in conformity with the shape of the mating side as a whole.

The locking portion 53 is a part for locking the opening edge part of the body wiring hole 11 from an inner side in the inserting direction S. This locking portion 53 is shaped to protrude radially outward from the outer peripheral part of the inserting portion 52. More specifically, the locking portion 53 is shaped to extend radially outward and backward in the inserting direction S from the outer peripheral part of a front end part of the inserting portion 52 in the inserting direction S and a tip part thereof is a free end. Specifically, a radially outward projecting distance of the locking portion 53 gradually increases from a front side toward a back side in the inserting direction S. A locking surface which can come into contact with the opening edge part of the body wiring hole 11 is provided on a tip part of this locking portion 53. Further, the locking portion 53 is provided to be resiliently deformable radially inward from a state protruding radially outward from the outer peripheral part of the inserting portion 52.

The locking portions 53 are resiliently deformed radially inward until being accommodated into the body wiring hole 11 while being held in contact with the opening edge part of the body wiring hole 11 when the inserting portion 52 is inserted into the body wiring hole 11. Further, the locking portions 53 return to their original shapes due to resilient restoring forces and face the opening edge part of the body wiring hole 11 from front in the inserting direction S after passing through the body wiring hole 11.

The locking portions 53 are provided at a plurality of positions in a circumferential direction of the inserting portion 52. Here, four locking portions 53 are provided at equal intervals in the circumferential direction of the inserting portion 52.

The jaw portion 54 is a part which faces the opening edge part of the body wiring hole 11 from behind in the inserting direction S. This jaw portion 54 is in the form of a jaw protruding radially outward from the outer peripheral part of the inserting portion 52. An outer peripheral part of the jaw portion 54 is formed to have a larger size than the body wiring hole 11. Further, the jaw portion 54 is provided at a distance equal to or larger (here, slightly larger) that the thickness of the opening edge part of the body wiring hole 11 from the locking surfaces of the locking portions 53.

The jaw portion 54 is arranged to face the opening edge part of the body wiring hole 11 from behind in the inserting direction S with the opening edge part of the body wiring hole 11 interposed between the jaw portion 54 and the locking portions 53 in a state where the inserting portion 52 is inserted into the body wiring hole 11. In this way, the body fixing member 50 is retained in the inserting direction S.

The biasing portion 55 is a part for suppressing the backlash of the body fixing member 50 relative to the body 10. This biasing portion 55 suppresses the backlash of the body fixing member 50 by sandwiching the body 10 between the locking portions 53 and the biasing portion 55 while biasing the body 10 forward in the inserting direction S. More specifically, the biasing portion 55 is formed into a jaw shape protruding radially outward from the outer peripheral part of the jaw portion 54 and gradually inward forward in the inserting direction S toward a tip side (outer peripheral side). The biasing portion 55 is so formed that an outer peripheral part is resiliently deformable backward in the inserting direction S from the above state. Further, the biasing portion 55 is so shaped that a tip part is located at a distance smaller than the thickness of the opening edge part of the body wiring hole 11 from the locking surfaces of the locking portions 53.

The biasing portion 55 is resiliently deformed backward in the inserting direction S by a part on the outer peripheral side being pressed against the rear surface of the body 10 around the opening edge part of the body wiring hole 11 in the inserting direction S in a state where the locking portions 53 are facing the opening edge part of the body wiring hole 11 from front in the inserting direction S. This causes the biasing portion 55 to be maintained in a state biasing the body 10 forward in the inserting direction S by a resilient restoring force.

The positioning ribs 56 are parts for positioning the wiring unit 40 arranged in the inserting portion 52 in an extending direction of the wiring unit 40. Here, the positioning ribs 56 are formed to be fittable to the convex and concave outer peripheral parts of the corrugated tube as the external member 42. More specifically, a plurality of positioning ribs 56 are formed into circumferentially extending elongated projections projecting radially inward from the inner peripheral surface of the inserting portion 52 and provided at intervals corresponding to the valley parts in an extending direction of the external member 42 (i.e. at the same intervals or at intervals which are twice as large) in a penetrating direction of the inserting portion 52.

The body fixing member 50 is formed by uniting a pair of divided members (here, substantially J-shaped members). Specifically, the positioning ribs 56 are fitted to the outer peripheral part of the exterior member 42 by uniting the pair of members with the exterior member 42 sandwiched therebetween, and the body fixing member 50 is mounted on the exterior member 42 relatively immovably in the extending direction of the exterior member 42. Here, the body fixing member 50 includes locking portions 58 projecting from one end parts of butting parts of the pair of dividing members and receiving portions 59 formed on the other end parts and lockable by the locking portions 58.

The body fixing member 50 is fixed to the opening edge part of the body wiring hole 11 in such a posture that the exterior member 42 is flat along the coupling axis of the hinge portions 19. This causes the wiring harness 1 arranged in the exterior member 42 to be restricted from being bent in a direction parallel to the coupling axes of the hinge portions 19 and to be easily bent and deformed on a plane perpendicular to the coupling axis of the hinge portions 19, and the wiring harness 1 is smoothly interlocked with the door 20 which is opened and closed about the coupling axis.

However, the body fixing member 50 is an example and the shape thereof is not limited to the above one as long as a part of the wiring unit 40 can be supported on the body 10 (preferably the wiring unit 40 can be protected from the opening edge part of the body wiring hole 11).

The protector 60 is a part for accommodating the wiring harness 1 introduced into and withdrawn from the door 20 as the door 20 is opened and closed in such a manner as to be able to absorb an extra length and protect the wiring harness 1 from outside. As shown in FIGS. 2 and 3, this protector 60 is arranged between the door trim 26 of the door 20 and the door inner panel 22 closer to the vehicle outer side than the door trim 26. The protector 60 includes an extra length absorbing portion 62, a guiding portion 66, a different route guiding portion 72, a water drainage hole 82 and a water drainage hole 82 (see FIGS. 5 and 6). The protector 60 may be described using the front-back direction in a state arranged in the door 20.

Figure 7:
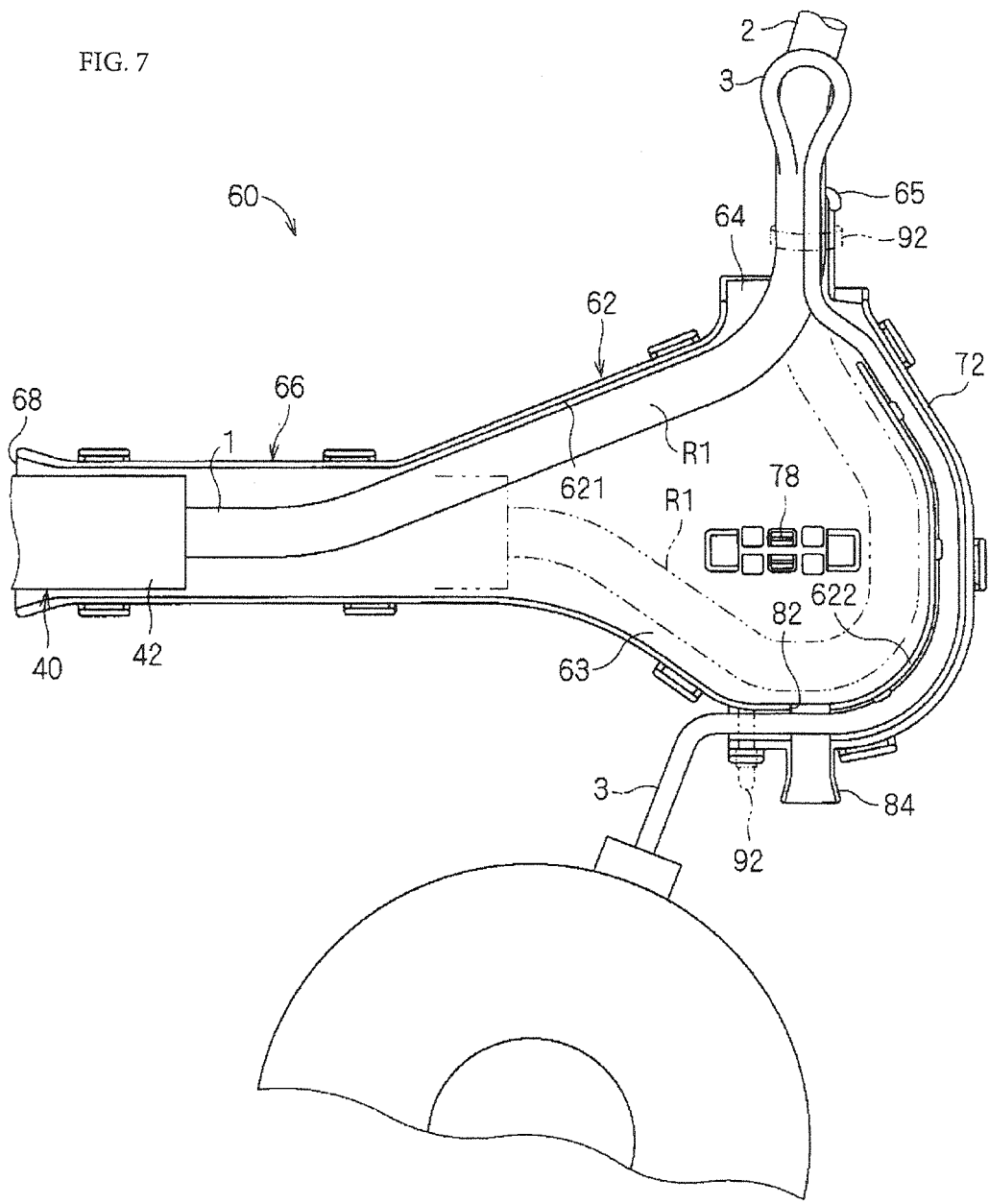
FIG. 7 is a view showing a relationship between the protector and a wiring unit.

Roughly, the protector 60 guides a part of the exterior member 42 including an end part on the side of the door 20 into a movement route by the guiding portion 66 and accommodates the wiring harness 1 extending from the end part of the exterior member 42 on the side of the door 20 using a margin space, into which the wiring harness 1 can be detoured, by the extra length absorbing portion 62 (see FIG. 7). More specifically, the wiring harness 1 is inserted through an insertion opening 68 in the guiding portion 66 of the protector 60 and drawn out through a draw-out opening in the extra length absorbing portion 62. Here, the insertion opening 68 and the draw-out opening 64 of the protector 60 penetrate in directions substantially perpendicular to each other. Further, the protector 60 guides the different route wire 3 into a route different from a route, in which the main route wire 2 is drawn out from the draw-out opening 64, by the different route guiding portion 72.

Further, the protector 60 is partly or entirely (here, substantially entirely) accommodated in the accommodating recess 23 formed in the door inner panel 22 between the door inner panel 22 and the door trim 26. Here, the accommodating recess 23 is formed at a position above the speaker arranged in the door 20 (see FIG. 1). More specifically, the protector 60 is so arranged that the insertion opening 68 is located on an inner peripheral side of the introducing opening 21 in a posture where the draw-out opening 64 is faced upward and the insertion opening 68 is faced forward. Note that facing upward means only facing upward and includes cases where a facing direction is inclined with respect to the vertical direction.

The configuration of each component of the protector 60 is described in detail below.

The guiding portion 66 is formed into a tubular shape, an end part of which on the side of the door 20 is continuous with the extra length absorbing portion 62, and includes the insertion opening 68 on the body-side end part thereof. More specifically, the guiding portion 66 is formed into a tubular shape whose cross-section perpendicular to the penetrating direction is substantially rectangular. Here, the guiding portion 66 is substantially linearly shaped and provided in a posture extending along the front-back direction of the door 20. The guiding portion 66 restricts the route in radial directions (mainly, a short side direction, i.e. vehicle inward/outward direction in the cross-section) with respect to a center axis of the exterior member 42 by bringing the exterior member 42 inserted through the insertion opening 68 into contact with an outer peripheral part thereof. However, the guiding portion 66 has only to be able to mainly restrict the route in the short side direction in the cross-section and may be formed into a tubular shape having an elliptical, circular or polygonal cross-section.

Further, in a relationship between the guiding portion 66 and the exterior member 42, a part of the exterior member 42 including at least the end part on the side of the door 20 is long enough to be inserted into the guiding portion 66 in the opened state of the door 20. On the other hand, the guiding portion 66 has only to be able to guide the exterior member 42 moved back and forth in the door 20 toward the extra length absorbing portion 62 when the door 20 is opened and closed. Here, the end part of the exterior member 42 on the side of the door 20 is set to have such a length as to project into the extra length absorbing portion 62 in the closed state of the door 20.

Further, the insertion opening 68 of the guiding portion 66 is formed to be at least partly (here, entirety) gradually widened radially outward toward an opening edge part in a circumferential direction. Further, the insertion opening 68 may be so formed that inner and outer peripheral edge parts in at least a part of the opening end portion thereof in the circumferential direction are rounded. According to such a shape of the insertion opening 68, the wiring unit 40 is smoothly moved into and out of the guiding portion 66.

The extra length absorbing portion 62 is a part connected to a side (rear side) of the guiding portion 66 opposite to the insertion opening 68 and internally includes an accommodation space capable of accommodating the wiring harness 1 extending from the end part of the exterior member 42 on the side of the door 20 and including a margin space into which the wiring harness 1 can be detoured. Further, the draw-out opening 64 of the extra length absorbing portion 62 is provided at a position spaced apart from the guiding portion 66 via the accommodation space.

This extra length absorbing portion 62 is so formed that the wiring harness 1 extending from the end part of the exterior member 42 on the side of the door 20 can be accommodated in such a manner as to be able to absorb the extra length by bending and detouring the wiring harness 1 between a first route R1 and a second route R2, an intermediate part of which is bulging away from the first route R1 (see FIG. 7). More specifically, the extra length absorbing portion 62 includes a first wall portion 621 and a second wall portion 622 facing each other across the accommodation space in a side view. The wiring harness 1 accommodated in the accommodation space is arranged to come closer to the first wall portion 621 when passing in the first route R1 and come closer to the second wall portion 622 when passing in the second route R2. Specifically, the margin space enabling the wiring harness 1 to be detoured toward the second wall portion 622 is present in a state where the wiring harness 1 is passing in the first route R1.

Figure 5:
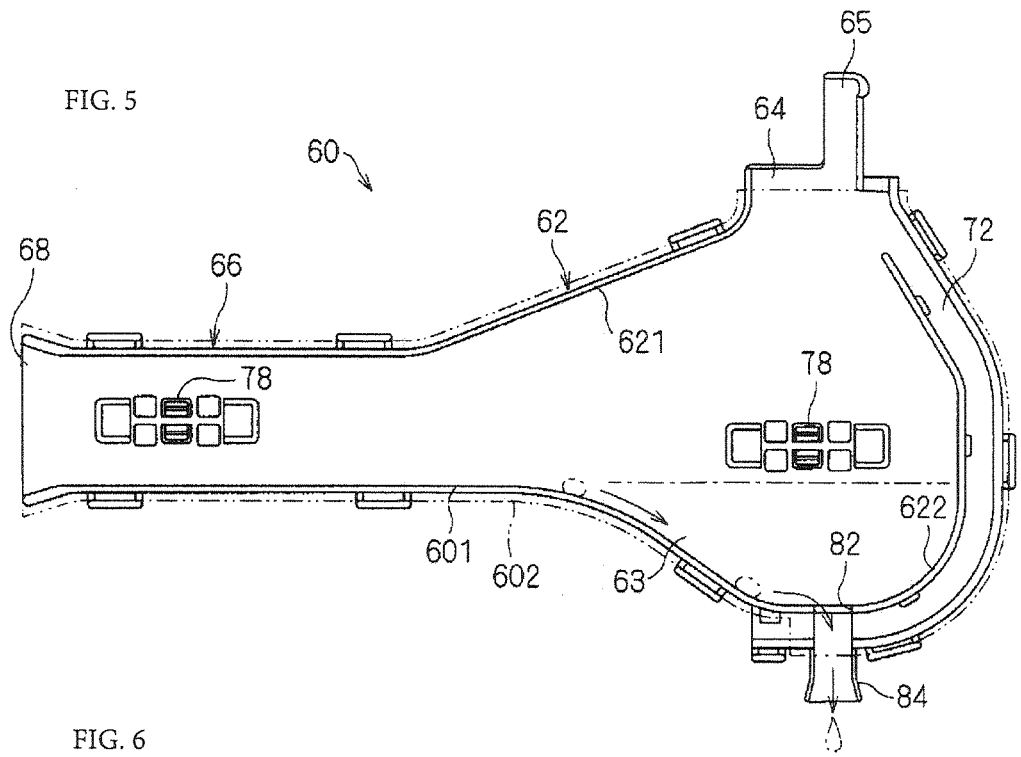
FIG. 5 is a side view of a protector.

One end part of each of these first and second wall portions 621, 622 is connected to the guiding portion 66 and the other end part is connected to the draw-out opening 64. More specifically, the first wall portion 621 extends in such a manner as to connect the guiding portion 66 and the draw-out opening 64 substantially straight at an inner peripheral side of an L-shaped virtual route extending along the penetrating direction of the insertion opening 68 and that of the draw-out opening 64 in a side view. Further, the second wall portion 622 extends in such a manner as to be spaced apart from the first wall portion 621 by the accommodation space and connect the guiding portion 66 and the draw-out opening 64 in a curved state bulging toward the outer peripheral side at an outer peripheral side of the L-shaped virtual route. Here, the second wall portion 622 is formed to bulge toward the rear side and lower side of the door 20. Here, a part of the extra length absorbing portion 62 bulging further downward than the guiding portion 66 (insertion opening 68) is referred to as a lower bulging portion 63. In other words, the lower bulging portion 63 is a part bulging toward a side opposite to an opening direction of the draw-out opening 64. In FIG. 5, the lower bulging portion 63 is a part of the extra length absorbing portion 62 below dashed-dotted line.

The extra length absorbing portion 62 accommodates the wiring harness 1 extending from the end part of the exterior member 42 on the side of the door 20 such that the wiring harness 1 passes in the first route R1 with the margin space enabling the detour located on the side of the second wall portion 622 in the opened state of the door 20 (solid line of FIG. 7). Further, the extra length absorbing portion 62 accommodates the wiring harness 1 such that the wiring harness 1 passes in the second route R2 in the closed state of the door 20 (chain double-dashed line of FIG. 7). Specifically, the extra length absorbing portion 62 absorbs the extra length of the wiring harness 1 associated with the closing movement of the door 20 by allowing the part of the wiring harness 1 pushed into the accommodation space as the door 20 is closed from the opened state to be bent therein and detoured from the first route R1 to the second route R2 longer than the first route R1.

Further, the extra length absorbing portion 62 includes a draw-out positioning portion 65 capable of fixing the wiring harness 1 at the draw-out opening 64. The draw-out positioning portion 65 is formed by partially extending an opening edge part of the draw-out opening 64 (here, to have an L-shaped cross-section). The wiring harness 1 drawn out through the draw-out opening 64 can be positioned with respect to the protector 60 at the draw-out opening 64 by tightening the wiring harness 1 by a fastening band 92 or taping the wiring harness 1 (here, tightened by the fastening band 92) in a state where the wiring harness 1 is held in contact with the inner side of the draw-out positioning portion 65. Note that a tape may be wound around an outer peripheral part of a part of the wiring harness 1 tightened by the fastening band 92. This can suppress the tension or slackening of the wiring harness 1 arranged in the body 10 even if the wiring harness 1 moves back and forth in the extra length absorbing portion 62 when the door 20 is opened and closed.

The different route guiding portion 72 is a part for guiding the different route wire 3 of the wiring harness 1 drawn out from the draw-out opening 64 into a route different from that of the main route wire 2 and extending along the outer surface of the extra length absorbing portion 62 (see FIG. 7). More specifically, the different route guiding portion 72 guides the different route wire 3 branched and U-turned from the main route wire 2 of the wiring harness 1 drawn out from the draw-out opening 64 toward a connection position to the electrical device (speaker) to which the different route wire 3 is to be connected. Here, the different route guiding portion 72 guides the different route wire 3 to a side below the draw-out opening 64 toward the speaker arranged below the protector 60 in the door 20.

One end of this different route guiding portion 72 is open to the interior of the draw-out opening 64 and the other end thereof is open at a position proximate to the connection position to the speaker. Here, the different route guiding portion 72 forms a route passing behind the extra length absorbing portion 62. More specifically, the different route guiding portion 72 is formed to extend from the rear side to the lower side along the outer surface of the second wall portion 622 of the extra length absorbing portion 62. Further, the different route guiding portion 72 is formed into a tubular shape, one wall portion of which is formed by a part of the second wall portion 622 of the extra length absorbing portion 62. However, the different route guiding portion 72 may be formed, for example, into a groove shape without being limited to the above shape.

The wiring harness 1 drawn out from the draw-out opening 64 and the different route wire 3 U-turned before the draw-out positioning portion 65 are fixed to the draw-out positioning portion 65 by the fastening band 92, and the different route wire 3 U-turned and returned into the draw-out opening 64 is arranged in the different route guiding portion 72. This different route wire 3 is guided to a side below the protector 60 along the different route guiding portion 72 and extends from the different route guiding portion 72 to be connected to the speaker located ahead. Note that the different route wire 3 extending from the different route guiding portion 72 may be fixed to an end part of the different route guiding portion 72 by the fastening band 92 or the like.

The water drainage hole 82 and the water drainage hole 82 are described in detail later.

Figure 6:
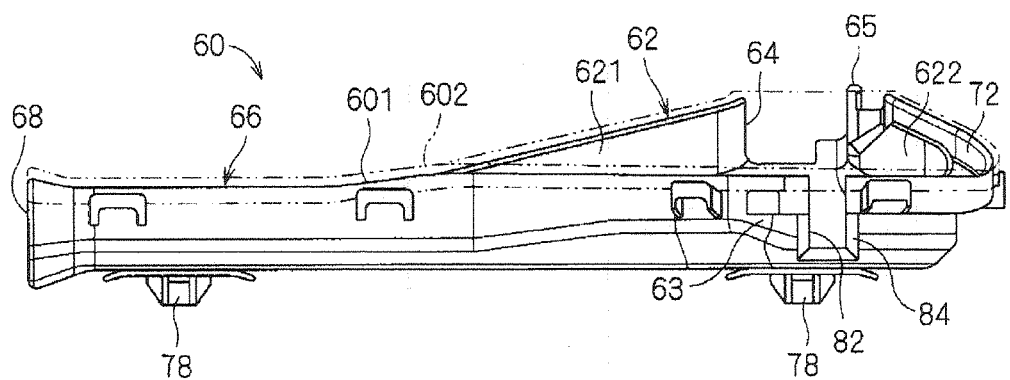
FIG. 6 is a bottom view of the protector.

The above protector 60 is formed by combining a pair of members (see FIGS. 5, 6). More specifically, the protector 60 can be formed by uniting a recessed member 601 and a lid-like member 602 respectively formed such as by injection-molding a synthetic resin material such as PP (polypropylene), PA (polyamide). The recessed member 601 and the lid-like member 602 are brought closer and united in a direction (vehicle inward/outward direction) substantially perpendicular to the penetrating direction of the insertion opening 68 and that of the draw-out opening 64. Specifically, the protector 60 is assembled by uniting the lid-like member 602 to close an opening of the recessed member 601. Note that the protector 60 may include a locking structure for maintaining a united state of the recessed member 601 and the lid-like member 602. For example, a configuration including frame-shaped receiving portions provided at a plurality of positions on lateral edge parts of the recessed member 601 and locking portions provided at a plurality of positions on lateral edge parts of the lid-like member 602 and to be inserted into and locked to the respective receiving portions can be adopted as the locking structure.

Further, the protector 60 is fixed to the door 20 in a state arranged in the accommodating recess 23 of the door inner panel 22. The protector 60 includes door fixing portions 78 fittable to a hole formed on the accommodating recess 23 as a configuration for this purpose. The door fixing portions 78 are shaped to be fitted into the hole by pressing the protector 60 against the door inner panel 22 toward the vehicle outer side. For example, the door fixing portion 78 can be configured to include a base shaft portion projecting from the outer surface of the protector 60 and a locking portion formed to protrude radially outward from a tip part of the base shaft portion and resiliently deformable between a state locking an opening edge part of the hole and a state deflected radially inward from the former state. Further, the fixing portion may include a biasing piece for biasing the opening edge part from an opposite side in a state where the locking portion locks the opening edge part of the hole. Here, two door fixing portions 78 are provided to project respectively from the extra length absorbing portion 62 and the guiding portion 66 on a side surface of the protector 60 on the vehicle outer side. By inserting these door fixing portions 78 into the hole formed in the door inner panel 22, the locking portions come into contact with the opening edge part of the hole to be resiliently deformed radially inward and are resiliently restored toward a radially outer side at a position beyond the hole to lock the opening edge part from the vehicle outer side.

However, another fixing structure may be adopted as a configuration for fixing the protector 60 to the door 20. For example, the protector 60 may be shaped to be able to be fixed to the door inner panel 22 such as by screwing, bolting, or fixing by a stud bolt or a bracket. Further, the protector 60 may be fixed to the door trim 26 as an interior member.

Although the protector 60 formed by the recessed member 601 and the lid-like member 602 has been described as an example, it may be formed such as by combining recessed members. Further, the protector 60 may be a recessed member and configured such that an opening thereof is closed by a part of the door trim 26. Also when the protector 60 is formed into the above shape, it is sufficient to form the water drainage hole 82 and a lead-out portion 84 to be described later by the respective members.

The shape of the aforementioned protector 60 is an example and various other shapes can be adopted. Specifically, the protector 60 has only to be configured to be able to accommodate the wiring harness 1 inserted from the insertion opening 68 while including a space into which the wiring harness 1 can be detoured by the extra length absorbing portion 62 and may be formed in consideration of the shape and the like of the door 20 according to a vehicle type. For example, the protector may be so shaped that the extra length absorbing portion 62 is directly connected to the rear side of the insertion opening 68 or the lower bulging portion 63 is omitted. In addition, the protector may be shaped to accommodate the wiring harness 1 while winding it in a ring and include an accommodating portion into which the wiring harness 1 can be detoured by changing a diameter of a ring part. Also in this case, the different route guiding portion 72 is preferably formed along the outer surface of the extra length absorbing portion 62.

The above wiring harness wiring structure 30 is preferably assembled before being assembled into the vehicle by forming the wiring unit 40, the body fixing member 50 and the protector 60 to be arranged from the body 10 into the door 20 as modules. Specifically, the exterior member 42 is mounted on the wiring harness 1, the wiring harness 1 extending from each of one and the other end parts of the exterior member 42 is fixed by winding the tape 90 and the body fixing member 50 is mounted on a part of the exterior member 42 near the one end part. Then, a part of the exterior member 42 including the other end part is arranged into the guiding portion 66 of the protector 60 and the wiring harness 1 extending from the other end part of the exterior member 42 is accommodated into the extra length absorbing portion 62 and drawn out through the draw-out opening 64. The different route wire 3 of the wiring harness 1 drawn out from the draw-out opening 64 is U-turned and returned into the draw-out opening 64, and the wiring harness 1 and the U-turned different route wire 3 are fixed to the draw-out positioning portion 65 by the fastening band 92. Further, the U-turned different route wire 3 is arranged into the different route guiding portion 72 through an opening on the side of the draw-out opening 64.

<Water Drainage Structure>

Figure 8:
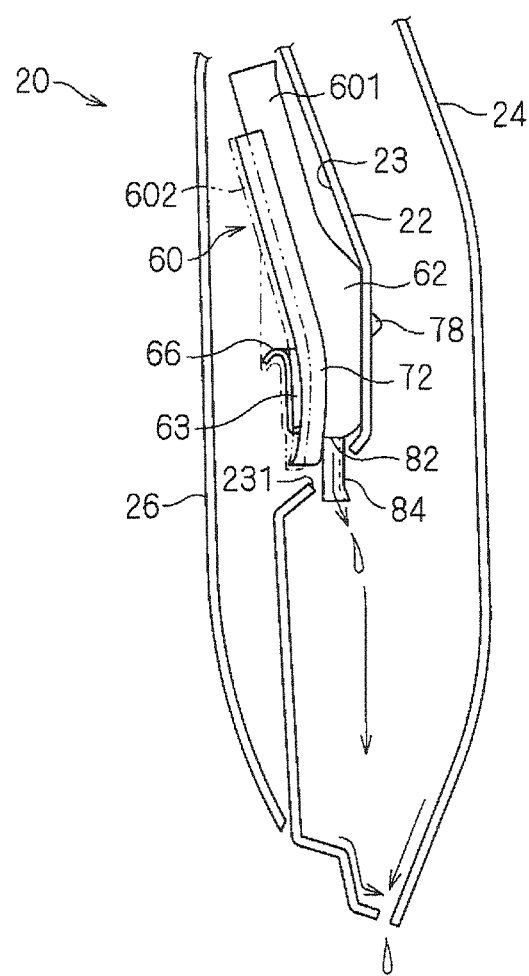
FIG. 8 is a view showing a water drainage structure viewed from behind the door.

Further, the wiring harness wiring structure 30 is structured to be able to drain water from the interior of the protector 60 (see FIG. 8). This water drainage structure includes the water drainage hole 82 and the lead-out portion 84 of the protector 60.

In the door 20, water deposited on a window may run down on the window and enter the inside such as when it rains. The window vertically moved relative to the door 20 moves between the door inner panel 22 and the door outer panel 24 in the door 20. Thus, water running down on the window and entering into the door 20 enters between the door inner panel 22 and the door outer panel 24. The water having entered into the door 20 is drained to the outside of the door 20 through a clearance between lower end parts of the door inner panel 22 and the door outer panel 24.

The water drainage structure in this wiring harness wiring structure 30 is configured to guide water (including dust, sand and the like washed away by water) deposited on the wiring unit 40 extending between the body 10 and the door 20 and entering into the protector 60 into between the door inner panel 22 and the door outer panel 24 and drain the water to the outside of the door 20 when the door 20 is in the opened state.

The door inner panel 22 is formed with a through hole penetrating from the vehicle inner side to the vehicle outer side. More specifically, the through hole 231 is formed below a part of the accommodating recess 23 where the extra length absorbing portion 62 of the protector 60 is arranged. Specifically, the through hole 231 is formed in a lower part of the accommodating recess 23 intersecting with the vertical direction.

The water drainage hole 82 is a hole formed below the extra length absorbing portion 62 of the protector 60 and penetrating to the outside of the protector 60 (see FIGS. 5, 6). Here, the water drainage hole 82 is formed in a lower end part of the lower bulging portion 63 of the extra length absorbing portion 62 bulging further downward than the guiding portion 66. The water drainage hole 82 penetrates to an outer side of the extra length absorbing portion 62 opposite to the draw-out opening 64. Note that the lower end part of the lower bulging portion 63 means a lower end part in a state where the protector 60 is arranged in the door 20, and the position of the water drainage hole 82 is preferably determined in accordance with an arrangement posture of the protector 60. Further, the water drainage hole 82 is formed on a part on the vehicle outer side (lateral side at the vehicle outer side of the different route guiding portion 72) of the lower end part of the lower bulging portion in the vehicle inward/outward direction. This water drainage hole 82 has a substantially rectangular opening.

The protector 60 is arranged at such a position of the accommodating recess 23 where the water drainage hole 82 is vertically above and overlapping the through hole 231 of the door inner panel 22. Further, the through hole 231 located below and overlapping the water drainage hole 82 is formed to be larger than the water drainage hole 82 and includes a projection range of the water drainage hole 82 in the vertical direction. Specifically, the water drainage hole 82 and the through hole 231 are set to have such shape and positional relationships that water falling down through the water drainage hole 82 passes through the through hole 231.

This water drainage hole 82 is formed by closing an opening part of a recessed cut part of the recessed member 601, which is open at an end edge part of the second wall portion 622, by the lid-like member 602. Specifically, the water drainage hole 82 is formed by a combination of an inner peripheral edge part of the cut part of the recessed member 601 and the inner surface of the lid-like member 602.

The lead-out portion 84 is a part formed into a tubular or groove shape extending downward from the water drainage hole 82. This lead-out portion 84 is shaped to include a wall portion extending along an opening edge part of the water drainage hole 82. Here, the lead-out portion 84 is formed into a groove shape which is open to the vehicle inner side. Further, the lead-out portion 84 is dimensioned to project further downward than the different route guiding portion 72 from the water drainage hole 82.

The lead-out portion 84 is inserted into the through hole 231 of the door inner panel 22. Specifically, a tip part of the lead-out portion 84 projects between the door inner panel 22 and the door outer panel 24 through the through hole 231.

Further, the tip part of the lead-out portion 84 is at least partly shaped to be gradually widened radially outward. Here, the entire tip part (vehicle outer side, front side and rear side) of the lead-out portion 84 is shaped to be widened. Water being drained through the lead-out portion 84 easily flows to the vehicle outer side, i.e. is difficult to flow to the vehicle inner side (see FIG. 8) due to the shape of the part of the tip part of the lead-out portion 84 on the vehicle outer side widened toward the vehicle outer side.

This lead-out portion 84 is, as a part of the recessed member 601, formed into a groove shape which is open in an opening direction of the recessed member 601. Note that the recessed member 601 is so shaped that an intermediate part of the different route guiding portion 72 is cut off at the formation position of the lead-out portion 84 due to an advancing and retreating structure of a die in injection molding. Specifically, the lead-out portion 84 is open toward an opening side of the recessed member 601 through the cut part of the different route guiding portion 72. However, in injection molding, the recessed member 601 can also be formed such that the lead-out portion 84 is formed into a tubular shape and no cut is formed on the different route guiding portion 72 by using a die sliding mechanism.

Water (including dust and sand washed away by water) having entered into the protector 60 from the insertion opening 68 of the guiding portion 66 flows to the lower bulging portion 63 located below the guiding portion 66, and is drained from the interior of the extra length absorbing portion 62 through the water drainage hole 82 formed in the lower end part of the lower bulging portion 63 (see FIG. 5). The water having passed through the water drainage hole 82 passes through the through hole 231 via the lead-out portion 84 and is drained between the door inner panel 22 and the door outer panel 24 (see FIG. 8). Here, the water passing through the lead-out portion 84 is guided to the vehicle outer side along the wall portion of the lead-out portion 84. The water drained between the door inner panel 22 and the door outer panel 24 is further drained to the outside of the door 20 through the clearance between the lower end parts of the door inner panel 22 and the door outer panel 24.

In this way, the water having entered into the protector 60 is drained to the outside of the door 20. Further, dust, sand and the like having entered into the protector 60 are also drained to the outside of the door 20 together with the water.

According to the wiring harness wiring structure 30 configured as described above, the protector 60 includes the water drainage hole 82 formed in the lower part of the extra length absorbing portion 62, and the water drainage hole 82 is arranged at a position vertically above and overlapping the through hole 231 formed in the door inner panel 22 and penetrating from the vehicle inner side to the vehicle outer side between the door trim 26 and the door inner panel 22. Thus, water having entered into the protector 60 can be drained to the vehicle outer side of the door inner panel 22 through the water drainage hole 82 and the through hole 231 and the trapping of water in the door 20 can be suppressed.

Further, according to the protector 60 extending downward from the water drainage hole 82 and including the groove-like lead-out portion 84 inserted through the through hole 231 of the door inner panel 22, the entrance of water being drained from the interior of the protector 60 to the outside through the water drainage hole 82 into the vehicle inner side of the door inner panel 22 can be more reliably suppressed.

Further, according to the lead-out portion 84 shaped such that the tip part is at least partly widened radially outward, it can be suppressed that water remains inside the lead-out portion 84.

Further, according to the lead-out portion 84 shaped such that the part of the tip part on the vehicle outer side is widened toward the vehicle outer side, water drained from the interior of the protector 60 is guided to the vehicle outer side and the entrance thereof into the vehicle inner side of the door inner panel 22 can be more reliably suppressed.

Further, according to the extra length absorbing portion 62 including the lower bulging portion 63 bulging further downward than the insertion opening 68 (guiding portion 66) and formed with the water drainage hole 82 in the lower end part of the lower bulging portion 63, water having entered into the protector 60 flows toward the lower bulging portion 63 and is drained from the water drainage hole 82 in the lower end part of the lower bulging portion 63. Thus, the trapping of water in the door 20 can be more reliably suppressed.

Although the exterior member 42 is mounted on the wiring harness 1 in the example described thus far, it may be omitted if the wiring harness 1 itself has such high rigidity as to be able to suppress bending, slackening and hanging. However, the exterior member 42 is preferably mounted in terms of protecting the wiring harness 1 and restricting the bending direction.

Further, although the protector 60 is arranged in the door 20 in such a posture where the guiding portion 66 extends along the front-back direction in the example described thus far, it may be arranged in such a posture where the guiding portion 66 is inclined with respect to the front-back direction. For example, if the protector 60 is arranged in the door 20 in such a posture where the guiding portion 66 is lowered on the side of the extra length absorbing portion 62, water having entered into the protector 60 is thought to be more easily drained from the water drainage hole 82. In this case, the position of the water drainage hole 82 may be determined according to the posture of the protector 60 in the state arranged in the door 20 and the water drainage hole 82 may be formed at a position on the lower end part of the extra length absorbing portion 62 (lower bulging portion 63).

Further, the lead-out portion 84 may be omitted. However, the lead-out portion 84 is preferably provided in terms of more reliably moving water drained from the water drainage hole 82 to the vehicle outer side of the door inner panel 22. Further, the lead-out portion may not be inserted through the through hole 231 of the door inner panel 22. Specifically, the lead-out portion is a configuration for more reliably guiding water to the vehicle outer side of the door inner panel 22 and can obtain an effect of improving reliability in draining water through the through hole 231 by guiding water to a position proximate to the through hole 231 from above even if the lead-out portion is not inserted through the through hole 231.

Further, although the wiring harness wiring structure 30 applied to the door 20 as a front side door is described as an example, it may be applied to a rear side door coupled to the body 10 by hinge portions 19 or the like. In this case, the wiring harness 1 is laid between a center pillar (pillar between the front side door and the rear side door) and the rear side door. Specifically, a through hole is formed in the center pillar and the body fixing member 50 is mounted into this through hole. A through hole is formed in a door inner panel of the rear side door and the protector 60 is preferably arranged in a recess in such a manner that the lead-out portion 84 is inserted through this through hole toward the vehicle outer side of the door inner panel 22.

Although this wiring harness wiring structure 30 has been described in detail above, the above description is illustrative in all aspects and this invention is not limited thereto. It should be appreciated that unillustrated numeral modifications can be made without departing from the scope of this invention.

The invention claimed is:

1. A wiring harness wiring structure for wiring a wiring harness between a body and a door of a vehicle, comprising:
   a wiring unit partly supported on the body and including the wiring harness; and
   a protector including an insertion opening into which the wiring unit is to be inserted, an extra length absorbing portion for accommodating the wiring harness of the wiring unit while including a margin space, into which the wiring harness of the wiring unit is detoured, a water drainage hole formed in a lower part of the extra length absorbing portion and arranged at a position vertically above and overlapping a through hole formed in a door inner panel and penetrating from a vehicle inner side to a vehicle outer side between a door trim of the door and the door inner panel closer to the vehicle outer side than the door trim;
   wherein:
   the protector extends downward from the water drainage hole and includes a lead-out portion having a tubular or groove shape and inserted through the through hole of the door inner panel; and
   the lead-out portion is so shaped that a tip part is at least partly widened radially outward.

2. A wiring harness wiring structure for wiring a wiring harness between a body and a door of a vehicle, comprising:
   a wiring unit partly supported on the body and including the wiring harness; and
   a protector including an insertion opening into which the wiring unit is to be inserted, an extra length absorbing portion for accommodating the wiring harness of the wiring unit while including a margin space, into which the wiring harness of the wiring unit is detoured, a water drainage hole formed in a lower part of the extra length absorbing portion and arranged at a position vertically above and overlapping a through hole formed in a door inner panel and penetrating from a vehicle inner side to a vehicle outer side between a door trim of the door and the door inner panel closer to the vehicle outer side than the door trim;
   wherein:
   the protector extends downward from the water drainage hole and includes a lead-out portion having a tubular or groove shape and inserted through the through hole of the door inner panel; and
   the lead-out portion is so shaped that a part of a tip part on the vehicle outer side is widened toward the vehicle outer side.

3. A wiring harness wiring structure for wiring a wiring harness between a body and a door of a vehicle, comprising:
   a wiring unit partly supported on the body and including the wiring harness; and
   a protector including an insertion opening into which the wiring unit is to be inserted, an extra length absorbing portion for accommodating the wiring harness of the wiring unit while including a margin space, into which the wiring harness of the wiring unit is detoured, a water drainage hole formed in a lower part of the extra length absorbing portion and arranged at a position vertically above and overlapping a through hole formed in a door inner panel and penetrating from a vehicle inner side to a vehicle outer side between a door trim of the door and the door inner panel closer to the vehicle outer side than the door trim;
   wherein:
   the extra length absorbing portion includes a lower bulging portion bulging further downward than the insertion opening; and
   the water drainage hole is formed in a lower end part of the lower bulging portion.

\* \* \* \* \*